(12) United States Patent
Yu (10) Patent No.: US 11,075,743 B2
(45) Date of Patent: Jul. 27, 2021

(54) ADJUSTABLE HIGH RESOLUTION TIMER

(71) Applicant: NXP USA, Inc., Austin, TX (US)

(72) Inventor: Mao Yu, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/004,541

(22) Filed: Aug. 27, 2020

(65) Prior Publication Data

US 2021/0067313 A1  Mar. 4, 2021

Related U.S. Application Data

(60) Provisional application No. 62/892,443, filed on Aug. 27, 2019.

(51) Int. Cl.
  *H04L 7/02* (2006.01)
  *H04L 7/00* (2006.01)

(52) U.S. Cl.
  CPC .............. *H04L 7/02* (2013.01); *H04L 7/0016* (2013.01)

(58) Field of Classification Search
  CPC ................ H04L 7/02; H04L 7/033; H04L 7/0331–0338; H04L 7/0016; G04F 10/00; G04F 10/005; G04F 10/02; G04F 10/04; G04F 10/06; H03M 1/50; H03M 1/502–508; H03M 1/60; H03M 1/62
  See application file for complete search history.

(56) References Cited

U.S. PATENT DOCUMENTS

| | | | | |
|---|---|---|---|---|
| 4,543,580 A * | 9/1985 | Bent | ........................ | G01S 5/02 342/388 |
| 5,546,032 A * | 8/1996 | Yatagai | .................. | H03L 7/0994 327/141 |
| 5,642,243 A * | 6/1997 | Bliss | ................ | G11B 20/10009 360/51 |
| 5,654,987 A * | 8/1997 | Nakamura | ............ | H04L 7/0334 375/355 |
| 5,875,218 A * | 2/1999 | Barham | ................ | H03L 7/0992 375/376 |
| 5,920,600 A * | 7/1999 | Yamaoka | .............. | H03L 7/0805 375/376 |
| 5,936,565 A * | 8/1999 | Bogdan | .................. | G06F 1/025 341/152 |
| 6,212,127 B1 * | 4/2001 | Funaba | ................ | G11C 7/1072 365/194 |

(Continued)

*Primary Examiner* — James M Perez (57) ABSTRACT

An adjustable high resolution timer (100) for synchronizing a local clock to an external reference clock includes frequency offset acquisition and compensation unit (110) configured to acquire a frequency offset difference between the local and external reference clock and to generate frequency adjustment signals based on the frequency offset difference; a time drift tracking and adjustment unit (120) configured to continuously monitor the local and external reference clocks for phase offset differences therebetween and to generate timing adjustment signals based on the phase offset difference; a nanosecond timer core unit (140) configured to generate a frequency and phase adjusted nanosecond timer output signal in response to the frequency adjustment signals and timing adjustment signals; and a pulse generation unit (130) for generating a plurality of output pulse signals that are synchronized with the external reference clock in response to the frequency and phase adjusted nanosecond timer output signal.

20 Claims, 3 Drawing Sheets

(56) References Cited

U.S. PATENT DOCUMENTS

| | | | | |
|---|---|---|---|---|
| 6,243,372 B1* | 6/2001 | Petch | | H04J 3/0682 370/324 |
| 6,247,138 B1* | 6/2001 | Tamura | | H04L 7/0025 713/600 |
| 6,377,647 B1* | 4/2002 | Kaku | | H03L 7/091 370/505 |
| 6,608,743 B1* | 8/2003 | Suzuki | | H03K 5/133 361/100 |
| 6,687,293 B1* | 2/2004 | Loyer | | G06K 19/0723 340/10.3 |
| 6,751,279 B1* | 6/2004 | Hipp | | H03L 7/18 331/50 |
| 7,119,599 B2* | 10/2006 | Saeki | | G06F 1/10 327/293 |
| 7,340,024 B1* | 3/2008 | Nelson | | H03H 17/028 375/293 |
| 8,755,468 B2* | 6/2014 | Matsuo | | H04L 7/0037 375/340 |
| 9,256,247 B2* | 2/2016 | Banerjea | | H04J 3/0667 |
| 9,285,778 B1* | 3/2016 | Evans | | H03L 7/085 |
| 9,369,270 B1* | 6/2016 | Spijker | | H04J 3/0641 |
| 9,590,646 B1* | 3/2017 | Gao | | H03L 7/0992 |
| 9,923,563 B1* | 3/2018 | Horovitz | | H03L 7/08 |
| 10,104,148 B2* | 10/2018 | Yang | | H04L 1/0018 |
| 10,116,199 B1* | 10/2018 | Halberstadt | | H02M 3/33569 |
| 10,169,171 B2* | 1/2019 | Rebello | | G06F 11/3476 |
| 10,691,150 B1* | 6/2020 | Delshadpour | | H03K 19/08 |
| 10,771,069 B1* | 9/2020 | Badizadegan | | H03M 9/00 |
| 2001/0033629 A1* | 10/2001 | Ito | | G11B 20/10 375/368 |
| 2002/0067785 A1* | 6/2002 | Tanahashi | | H04L 7/033 375/354 |
| 2002/0180498 A1* | 12/2002 | O'Leary | | H03L 7/14 327/156 |
| 2004/0099883 A1* | 5/2004 | Jung | | H03L 7/0805 257/200 |
| 2005/0286643 A1* | 12/2005 | Ozawa | | H03L 7/087 375/242 |
| 2006/0062338 A1* | 3/2006 | Chua | | H04L 7/005 375/372 |
| 2006/0164138 A1* | 7/2006 | Kakuta | | H03L 7/0995 327/156 |
| 2007/0047683 A1* | 3/2007 | Okamura | | H03L 7/0814 375/355 |
| 2008/0172194 A1* | 7/2008 | Mochizuki | | G01R 31/31709 702/72 |
| 2011/0170564 A1* | 7/2011 | Desbiens | | H01S 3/06754 372/6 |
| 2013/0173950 A1* | 7/2013 | Banerjea | | G06F 1/04 713/503 |
| 2013/0243056 A1* | 9/2013 | Chmelar | | H04L 7/033 375/224 |
| 2013/0243107 A1* | 9/2013 | Chmelar | | H04L 7/033 375/259 |
| 2013/0243127 A1* | 9/2013 | Chmelar | | H04L 7/033 375/316 |
| 2018/0091291 A1* | 3/2018 | Haddad | | H03L 7/0807 |
| 2018/0175905 A1* | 6/2018 | Nabki | | H04L 1/0057 |
| 2018/0191359 A1* | 7/2018 | Petrov | | H03L 7/0891 |
| 2019/0004563 A1* | 1/2019 | Nelson | | H03K 5/082 |
| 2019/0053013 A1* | 2/2019 | Markhovsky | | H04W 4/025 |
| 2019/0058480 A1* | 2/2019 | Kuan | | H03L 7/24 |
| 2020/0076439 A1* | 3/2020 | Weeks | | H03L 7/0992 |
| 2020/0280383 A1* | 9/2020 | Herber | | H04J 3/0638 |
| 2021/0067313 A1* | 3/2021 | Yu | | H04L 7/02 |

\* cited by examiner

ADJUSTABLE HIGH RESOLUTION TIMER

BACKGROUND

Field

The present disclosure is directed in general to timers and methods for operating same.

Description of the Related Art

For computer devices which operate using a reference clock signal, the reference clock frequency is not absolutely accurate. Accordingly, the accuracy of a reference clock frequency is typically characterized in terms of parts per million (PPM) as a convenient way to measure the clock performance quality. For example, a wireless device reference clock typically requires an accuracy within +/−20 ppm, which means that there will be 20 defects or events in a million clock pulses, or 20/1,000,000. This means that, for any two wireless devices, their reference clocks can be off by +/−40 PPM. For some applications which have many computer devices, the devices are all required to operate based on a global time, or "absolute time." This requires that each device's local time or clock signal needs to synchronize to the absolute time.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A need exists for improved timer devices and associated methods of operation to overcome the problems in the art, such as outlined above. Further limitations and disadvantages of conventional processes and technologies will become apparent to one of skill in the art after reviewing the remainder of the present application with reference to the drawings and detailed description which follow. An adjustable high resolution timer architecture is described for use with computer devices having a local or reference clock generator. The proposed adjustable timer can help to achieve synchronization between different computer devices which have different clock sources, such as by implementing a Precision Time Protocol (PTP) hardware clock for use in various kinds of time synchronizations. The PTP protocol is used to synchronize clocks throughout a computer network, and is defined in the IEEE 1588 standards which describe a hierarchical master-slave architecture for clock distribution. Under this architecture, a time distribution system consists of one or more communication media (network segments), and one or more clocks. In selected example embodiments, the adjustable high resolution timer includes a nano-second timer core unit which receives control inputs from a frequency detection/compensation unit and from a time adjustment and drift tracking unit, and which provides a time output signal to a pulse generation unit for generating synchronized output pulse signals. In particular, the frequency detection/compensation unit may use a frequency offset acquisition module to detect a frequency difference between a local clock and external reference clock, and may use a frequency offset compensation module to determine how much to adjust the frequency of the local clock. Once the local clock is running at the same frequency as the external reference clock, the clock phases are aligned to make the local clock have the same read time, {date:hour:minute:second:nano-second}, as the reference clock. After frequency offset compensation and phase adjustment, the local clock is synchronized to the reference clock within the required range, but to address any gradual drift, the adjustable timer continuously monitors the frequency offset and phase offset to make any required adjustments through a frequency offset tracking module and drift tracking module. By applying the compensations and adjustments at the adjustable timer, the local clock is synchronized to the external reference clock within acceptable range whenever checked. In the disclosed adjustable high resolution timer, the timer resolution can be finer than the computer device's highest frequency clock resolution.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in simplified schematic diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
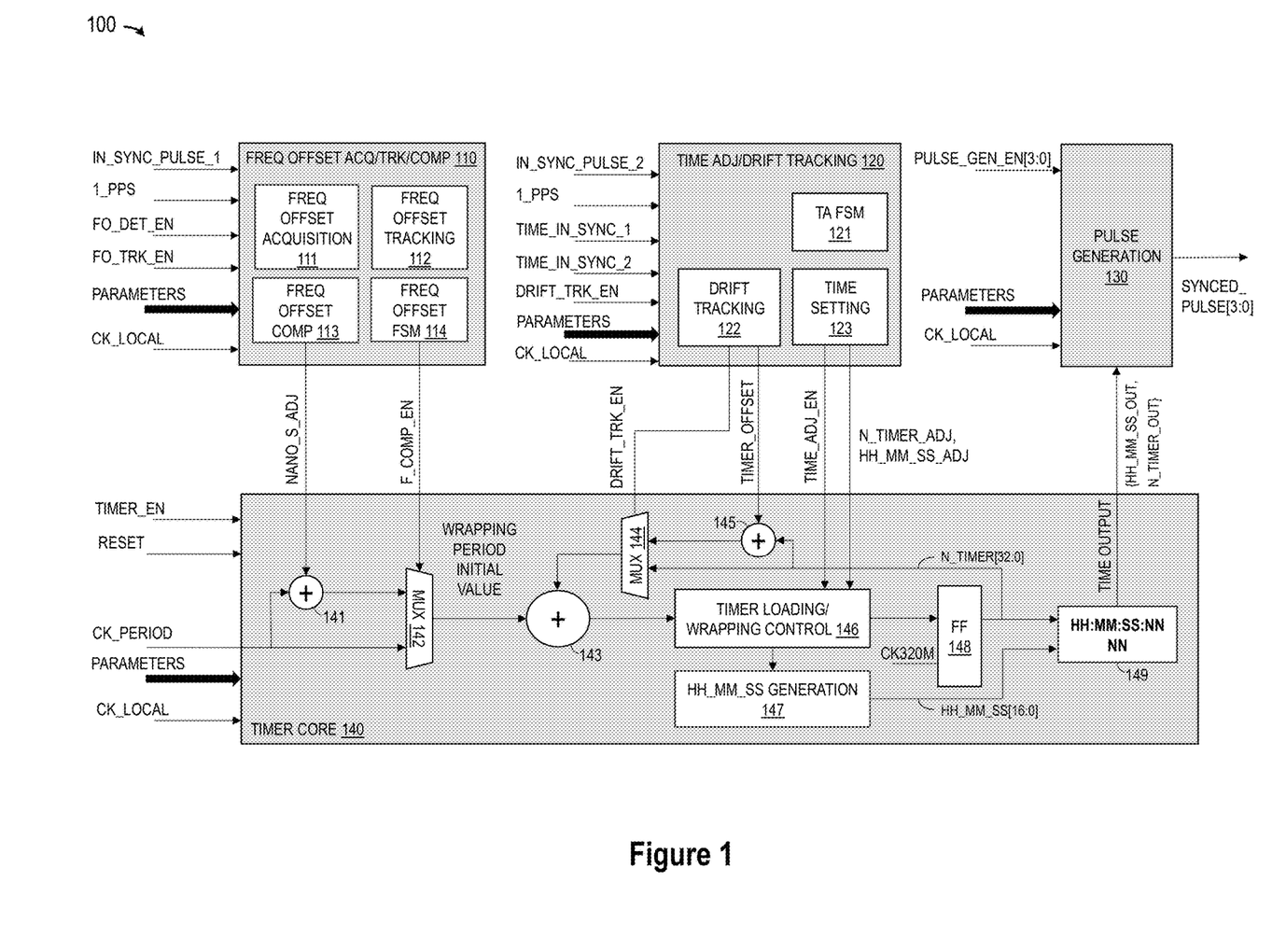
FIG. 1 depicts a top level block diagram of an adjustable high resolution timer in accordance with selected embodiments of the present disclosure.

To provide additional details for an improved contextual understanding of the present disclosure, reference is now made to FIG. 1 which depicts a top level block diagram of an adjustable high resolution timer 100 in accordance with selected embodiments of the invention. The depicted adjustable high resolution timer 100 includes a frequency offset acquisition, tracking, and compensation (FOATC) unit 110, a time adjustment and drift tracking (TADT) unit 120, a pulse generation unit 130, and a nano-second timer core 140 which receives control inputs from the FOATC unit 110, a TADT unit 120 to provide a time output signal to the pulse generation unit 130 for generating synchronized output pulse signals (SYNCED PULSE [3:0]).

Frequency Offset Acquisition, Tracking, and Compensation

As depicted, the FOATC unit 110 includes a first frequency offset acquisition module 111, a second frequency offset tracking module 112, a third frequency offset compensation module 113, and a fourth frequency offset finite state machine (FSM) module 114. The FOATC unit 110 is connected to receive a local clock input signal (CK_local) having the clock period N_local. In addition, the FOATC unit 110 is connected to receive real time input signals from outside modules under control of one or more processor control units, including a first input pulse train signal (In_sync_pulse_1) having a set frequency with a period T_sync_1 that is to be compared to the local clock input signal. The FOATC unit 110 is also connected to receive a second input pulse train signal (1_PPS) which is a 1 pulse per second signal with a period T_second.

The FOATC unit 110 is also connected to receive input control signals from one or more control registers, where some of the input control signals need synchronization before driving circuitries. In particular, the FOATC unit 110 is connected to receive a first control signal (Fo_det_en) which enables the frequency offset detection. The ATC unit 110 is also connected to receive a second control signal (Fo_trk_en) which enables any frequency offset tracking when implemented in hardware.

Figure 3:
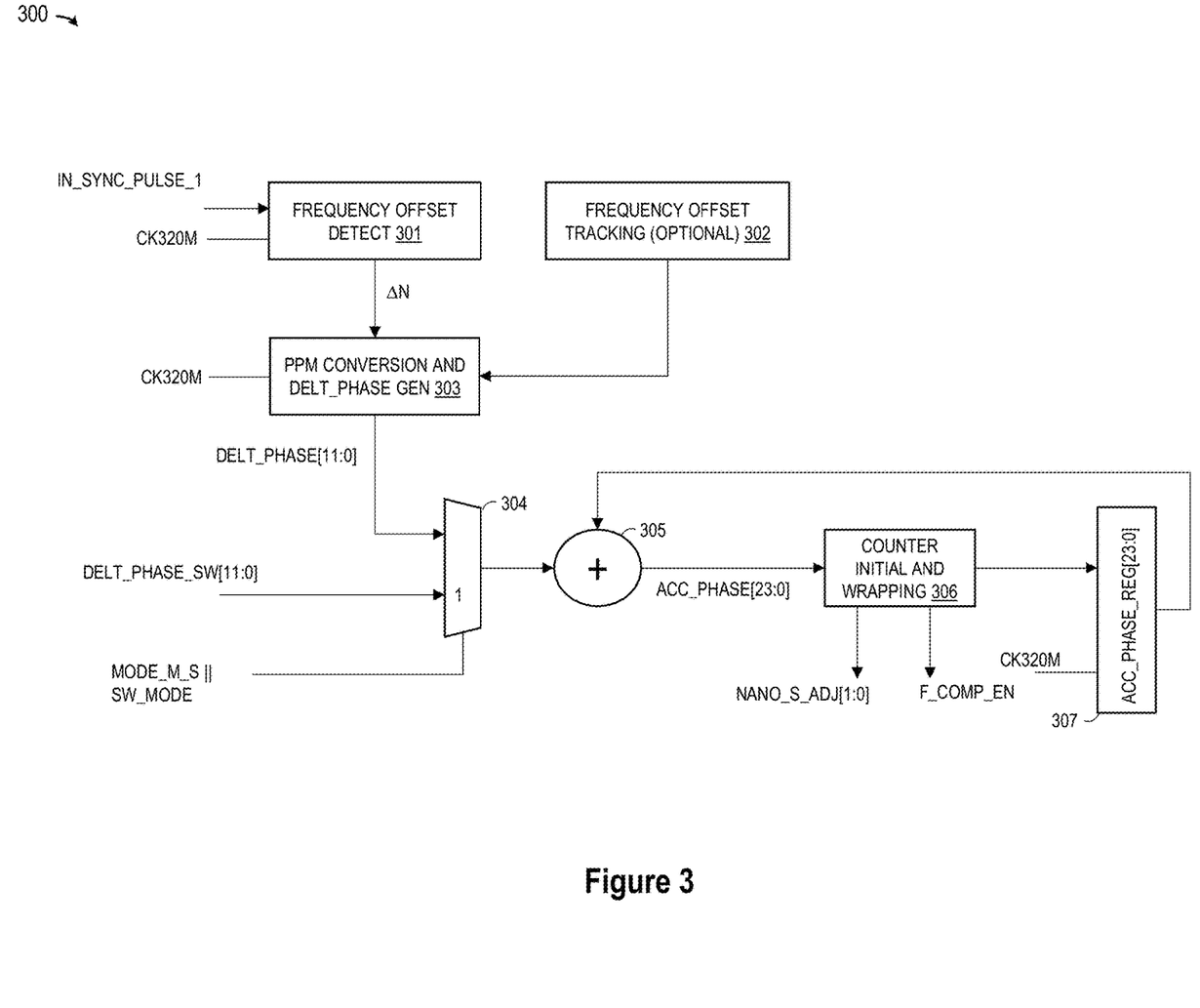
FIG. 3 depicts a frequency offset acquisition, tracking and compensation unit in accordance with selected embodiments of the present disclosure.

In addition, the FOATC unit 110 is connected to receive input parameters from the host software that are stored in one or more control registers and used to control the operation of the FOATC unit 110. As described more fully hereinbelow, the input parameters provided to the FOATC unit 110, TADT unit 120, pulse generation unit 130, and timer core 140 are parenthetically indicated in the following list of parameters:

N_local: period of the local clock (frequency offset acquisition module 111 and frequency offset detector unit 301), CK_period[5:0]=6'b011001, u(6.3), unit is 1 ns (frequency offset compensation module 113 and PPM conversion and phase compensation generator unit 303), T_second=30'h3b9aca00 nano_second (timer loading/wrapping control unit 146), fo_mode: 1: frequency offset is from control register, fo_sw; 0: FO is from hardware detect (frequency offset compensation module 113 and PPM conversion and phase compensation generator unit 303), Fo_sw: frequency offset from host (frequency offset compensation module 113 and PPM conversion and phase compensation generator unit 303), Time_loading_mode[1:0] (time setting unit 123), Reg_wr_time: enable to load time (time setting unit 123), N_timer_in [29:0]: u(30.0), unit is 1 nano-second (time setting unit 123), hh_mm_ss_in[16:0]: for setting time, representing HOUR:MINUTE:SECOND=hh_mm_ss[16:12]: hh_mm_ss[11:6]: hh_mm_ss[5:0] (used by time setting unit 123 to generate hh_mm_ss_adj[29:0]), Pulse_gen_mode[3:0][1:0]: definitions of pulses to be generated (pulse generation unit 130), Start_time[3:0]: start time for the first pulse, for 4 independent pulses (pulse generation unit 130), Pulse_period[3:0][?:0]: period of each pulse (pulse generation unit 130), and Pulse_width[3:0][?:0]: absolute value or Special case: 1 320 MHz cycle (minimum pulse width (pulse generation unit 130).

Based on the real time input signals, control signals and input parameters, the FOATC unit 110 is configured to generate output signals to the nano-second timer core 140. In selected embodiments, a first output signal is generated by the third frequency offset compensation module 113 that is configured to output a first nanosecond adjustment signal (nano_s_adj) for adjusting an accumulator at the timer core 140. In selected embodiments, the nanosecond adjustment signal (nano_s_adj)[1:0] may be a two bit signal having an s(2.0) signal format where the unit is 1 nano-second. In selected embodiments, a second output signal is generated by the fourth frequency offset FSM module 114 that is configured to output a second frequency compensation enable signal (F_comp_en) for enabling the timer core 140 to adjust an accumulator increment by the first nanosecond adjustment signal (nano_s_adj). In addition, the frequency offset FSM 114 controls the processing sequence from reset (idle) state, to frequency offset detection 111, frequency offset compensation 113, and frequency offset tracking 112, if needed.

As will be appreciated, the reference clock frequency between different devices is typically not the same. As a result, the local timer will be drifting consistently if the frequency offset is not compensated. To provide frequency compensation, the frequency offset acquisition, tracking, and compensation (FOATC) unit 110 may be configured in two ways to obtain the frequency offset by setting input parameter (fo_mode). In a first embodiment, the frequency offset can be specified directly in a setting from the host directly using a specified input parameter (fo_sw) to specify the frequency offset. In another embodiment, the frequency offset can be acquired through the aid of external synchronization signals, like the input pulse train signal (1_PPS) and the input pulse train signal (in_sync_pulse_1) which are input to the FOATC unit 110.

Figure 2:
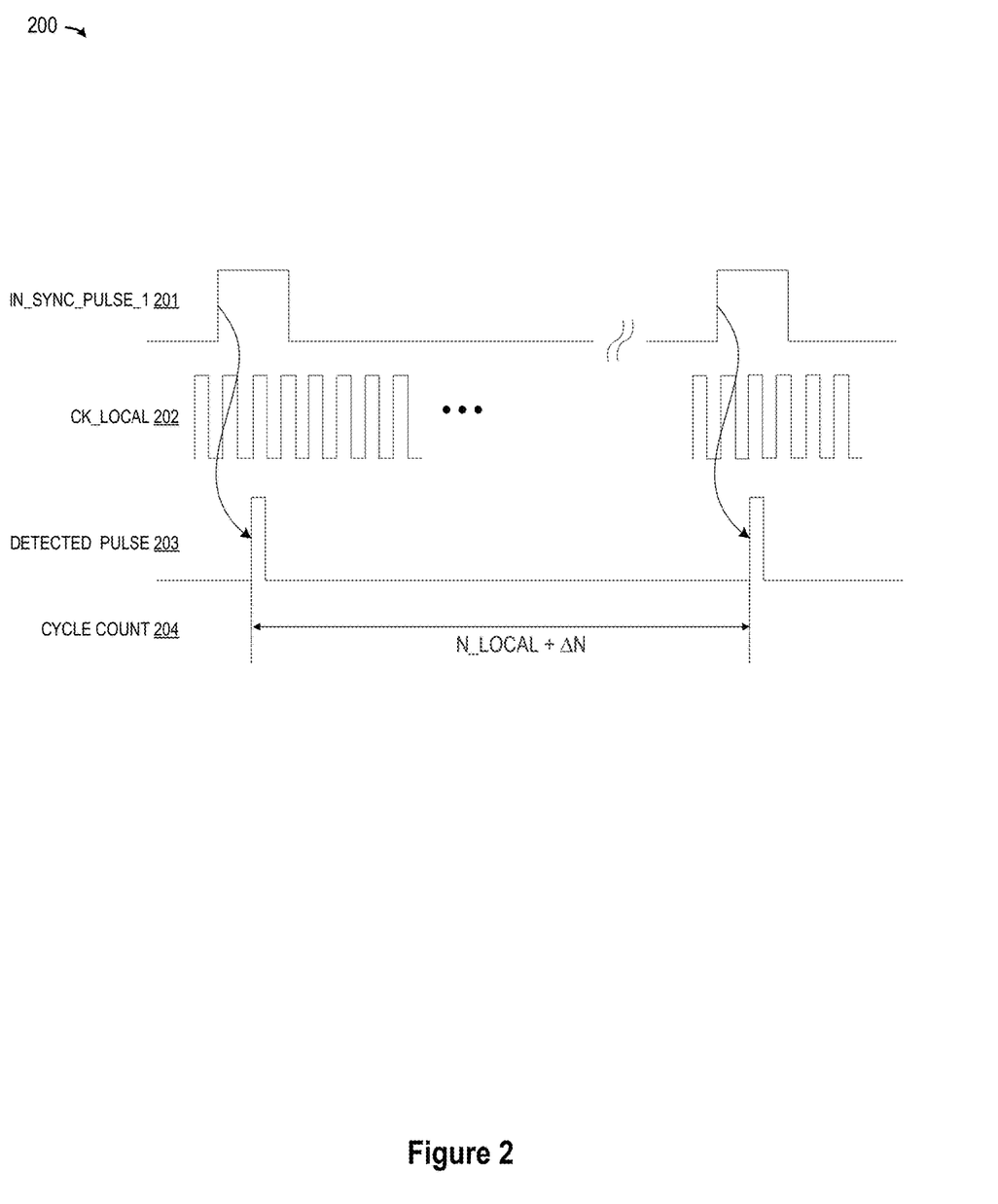
FIG. 2 depicts frequency offset detection timing waveforms for in accordance with selected embodiments of the present disclosure.

To provide additional details for an improved contextual understanding of how frequency offset acquisition works, reference is now made to FIG. 2 which depicts frequency offset detection timing waveforms 200 for in accordance with selected embodiments of the invention. In particular, the input pulse train signal (in_sync_pulse_1) is shown with a first waveform 201 which is periodic pulse train from outside with known frequency which can be selected from a pre-defined set {1 Hz, 1 KHz, 10 KHz, . . . }. In addition, the input local clock signal (CK_local) for the device is shown with a second waveform 202 which is periodic with period of CK_period ns. In the depicted example, the input pulse train signal (in_sync_pulse_1) 201 has a frequency of 1 KHz, and the local clock signal (CK_local) has a frequency of 320 MHz (e.g., CK320M). The third waveform 203 shows detection pulses that are triggered by the input pulse train signal (in_sync_pulse_1) 201, where the detection pulses are used to enable counting of the local clock pulses between two consecutive detected pulses. As depicted in the fourth waveform 204, the detected count of local clock pulses between consecutive detected pulses 203 is N_local+ΔN, where N_local=320 MHz/1 KHz=320K and where ΔN is the deviation or offset in clock pulses. The detected count may be output as a timer output value (N_sync_cnt) which is the total count of local clock pulses in one period of the input pulse train signal (in_sync_pulse_1). As a result, the frequency offset value (f_offset) can be converted to PPM units with the equation, F_offset=ΔN/320K=ΔN/0.32 (ppm), represented in the signal format s(10.2) which means 10 bit signed number with 2 fractional bits. The unit is PPM and the 10 bit signed signal, F_offset, is sufficient to represent +/−100 ppm frequency offset.

Depending on the frequency of external sync pulse signals (e.g., like 1_PPS and in_sync_pulse_1), the timer state 148 will have different phase jump at the boundary of the sync pulse, for a given frequency offset. For example, a 40 ppm frequency offset means there will be a 40 ns difference within each 1 KHz period, and 40 μs for 1 PPS sync pulse.

As disclosed herein, the FOATC unit 110 may be configured to provide frequency compensation so that there are not large phase jumps in the timer output from the nano-second timer core 140.

To provide additional details for an improved understanding of how frequency offset compensation may be implemented, reference is now made to FIG. 3 which depicts a frequency offset acquisition, tracking and compensation unit 300 in accordance with selected embodiments of the present disclosure. The depicted frequency offset acquisition, tracking and compensation unit 300 includes a frequency offset detector unit 301, an optional frequency offset tracking unit 302, and a PPM conversion and phase compensation generator unit 303.

For a given frequency offset which is specified either through detection or through a host setting, the frequency offset acquisition, tracking and compensation unit 300 may be configured to provide frequency offset compensation by first selecting a frequency offset (FO) according to control signal fo_mode (e.g., fo_sel=fo_mode? Fo_sw:f_offset). To this end, the FOATC unit 300 may include a PPM conversion and phase compensation generator unit 303 which is configured to calculate a phase compensation value (delt_phase) as the required amount of phase compensation needed in 1 CK_local cycle. In selected embodiments, the computed phase compensation value is delt_phase[11:0]=−f_sel*CK_Period*10^-6, in format s(12.22) in nano_second to maintain accuracy. Under control of a multiplex select signal (Mode_m_s∥sw_mode), an input multiplexer 304 selects between the first phase compensation signal (Delt_phase[11:0]) and a second software-specified phase compensation signal (Delt_phase_sw[11:0]) to provide a phase compensation signal input to the phase accumulator 305 which also receives a phase adjustment feedback value from the output register 307.

At the phase accumulator 305, the accumulated phase compensation signal (acc_phase[23:0]) is computed as the sum of the feedback signal acc_phase[23:0] from the output register 307 and the delt_phase value. In selected embodiments, the accumulated phase compensation signal has a s(24.22) format. If Acc_phase[23:22]==(2'b01 or 2'b10), then f_comp_en=1'b1, and Acc_phase_reg[22]=~acc_phase[22].

The accumulated phase compensation signal (acc_phase[23:0]) is provided to the counter initial and wrapping unit 306 which generates the nanosecond adjustment signal (nano_s_adj)[1:0] and frequency compensation enable signal (F_comp_en) for output to the timer core 140. In selected embodiments, the nanosecond adjustment signal is computed as nano_s_adj [1:0]=Acc_phase[23:22], s(2.0), unit is 1 nano-second, and is provided to the adder 141 in the timer core 140. In addition, the frequency compensation enable signal may be provided as a 1 cycle pulse to enable timer accumulation adjustment at the input multiplexer 142 of the timer core 140.

After frequency offset compensation, there will be still residue frequency offset, because the frequency offset obtained will not be very accurate. There are several possible causes for inaccuracies in the frequency offset. For example, there can be slew rate variations in the input pulse train signal (in_sync_pulse_1). Also, there can be asynchronization between the local clock and external clock. To address the residue frequency offset, the frequency offset tracking unit 302 can track the residue frequency through continuous frequency offset detection, in multiple cycles of the input pulse train signal (in_sync_pulse_1). However, if the residue frequency offset is not big enough to cause timer phase drift larger than required maximum jump before the next phase sync-up, then the frequency offset tracking step can be skipped or omitted.

Time Adjustment and Drift Tracking

As depicted, the TADT unit 120 includes a first timer adjustment FSM module 121, a second drift tracking module 122, and a third time setting unit 123. The timer adjustment FSM 121 monitors input signals, controls the internal processing logics in module 122, and module 123 according to the parameters, and also coordinates the processing sequence. The TADT unit 120 is connected to receive the local clock input signal (CK_local) having the clock period N_local. In addition, the TADT unit 120 is connected to receive real time input signals from outside modules under control of one or more processor control units, including a first input pulse train signal (In_sync_pulse_2) having a set frequency with a period T_sync_2 that is to be compared to the local clock input signal. The TADT unit 120 is also connected to receive the second input pulse train signal (1_PPS) which is a 1 pulse per second signal with a period T_second. In addition, the TADT unit 120 is connected to receive a third input signal (Time_in_sync_1) that is a single pulse signal. In addition, the TADT unit 120 is connected to receive a fourth input signal (Time_in_sync_2) which has a function to load the input time only once after the third input signal (Time_in_sync_1). As described more fully hereinbelow, there are four modes to load absolute timer value, according to parameter, time_loading_mode.

time_loading_mode=00: load time, upon register bit assertion, reg_wr_time.

time_loading_mode=01: load time upon time_in_sync1 immediately.

time_loading_mode=10: load time upon next 1_PPS after time_in_sync1.

time_loading_mode=11: Add time to current timer value, upon time_in_sync2.

The timer value to be set are N_timer_adj=n_timer_in and Hh_mm_ss_adj=hh_mm_ss_in.

The TADT unit 120 is also connected to receive input control signals from one or more control registers, where some of the input control signals need synchronization before driving circuitries. In particular, the TADT unit 120 is connected to receive a first control signal (drift_trk_en) which enables timer drift tracking.

In addition, the TADT unit 120 is connected to receive one or more of the input parameters listed above from the host software to control the operation of the TADT unit 120.

Based on the real time input signals, control signals and input parameters, the TADT unit 120 is configured to generate drift tracking output signals to the nano-second timer core 140. In selected embodiments, a first drift tracking output signal is generated by the drift tracking module 122 that is configured to output a first timer offset signal (timer_offset) for adjusting an accumulator at the timer core 140. In selected embodiments, a second drift tracking output signal is generated by the drift tracking module 122 that is configured to output a second drift tracking enable signal (drift_trk_en) for enabling the timer core 140 to adjust an accumulator increment by the timer offset signal (timer_offset). In selected embodiments, additional output signals are generated from the time setting unit 123, including a time adjustment enable signal (Time_adj_en) to enable time adjustment, and first adjustment signal (N_timer_adj) [29:0] for adjusting the nano-timer in nanoseconds, and a second adjustment signal (hh_mm_ss_adj) [16:0] for adjusting the hour-minute-second portion of the timer output 149.

To generate the drift tracking output signals, the TADT unit 120 includes internal logic by using in_sync_pulse_2 as reference. Upon every in_sync_pulse_2 pulse, the TADT unit 120 is configured to record the timer value as current_timer, and compute the target_timer value for next in_sync_pulse_2. In addition, the TADT unit 120 is configured to check the time_difference=current_timer−target_timer calculated at previous pulse of in_sync_pulse_2. If the |time_difference|>=2*CK_period, the TADT unit 120 sets timer_offset=−time_difference, and drift_trk_en=1.

High Resolution Timer Core

In selected embodiments, the nano-second timer core 140 is connected to receive the local clock input signal (CK_local) having the clock period N_local. In addition, the nano-second timer core 140 is connected to receive input control signals from one or more control registers, where some of the input control signals need synchronization before driving circuitries. In particular, the nano-second timer core 140 is connected to receive a first reset signal (reset) which resets the timer 140. Additional control input signals received at the nano-second timer core 140 include the output signals from the FOATC unit 110 and the TADT unit 120, including the nanosecond adjustment signal (nano_s_adj), the frequency compensation enable signal (F_comp_en), the drift tracking enable signal (drift_trk_en), the timer offset signal (timer_offset), the time adjustment enable signal (time_adj_en), the first adjustment signal (N_timer_adj), and the second adjustment signal (hh_mm_ss_adj). In addition, the nano-second timer core 140 is connected to receive one or more of the input parameters listed above, including the CK_period parameter, from the host software to control the operation of the nano-second timer core 140.

The depicted internal logic of the nano-second timer core 140 includes an accumulator 143 that is driven by the local clock input signal (CK_local) with a period of CK_period ns to form a nano-second timer. In selected embodiments, the accumulator 143 has 33 bits, with 30-bit integer part for nano-second counting to represent at least 1 second, and 3 fractional bits for maintaining accuracy. Under control of a multiplex select signal (f_comp_en) generated by the FOATC unit 110, a first input multiplexer 142 selects a first nominal increment value (CK_period) for input to the accumulator 143 when there is no frequency compensation needed (e.g., f_comp=0). However, when frequency compensation is required, the multiplex select signal (e.g., f_comp=0) generated by the FOATC unit 110 controls the input multiplexer 142 to select a second increment value (CK_period+nano_s_adj) from the adder 141 for input to the accumulator 143, where the adder 141 sums the frequency compensation amount (nano_s_adj) with the nominal increment value (CK_period). In this configuration, the input multiplexer 142 provides a wrapping period initial value to the accumulator 143 which also receives a timer phase adjustment feedback value from a second input multiplexer 144.

The incremental timer phase adjustment is realized under control of a multiplex select signal (drift_trk_en) generated by the TADT unit 120 which controls the second input multiplexer 144 to provide a second input to the accumulator 143. When the multiplex select signal has a first value (e.g., drift_trk_en=1), the incremental timer offset signal (timer_offset) is added to the accumulator 143 through the second input multiplexer 144.

In addition, the nano-second timer core 140 includes a timer loading/wrapping control unit 146 to that is configured to handle the timer value adjustment and timer wrap-around when loading the timer flip-flop 148. When an absolute timer value needs to loaded in the timer 148, the TADT unit 120 generates a control pulse signal (time_adj_en) and sets input values (e.g., n_timer_adj and hh_mm_ss_adj) for the timer loading/wrapping control unit 146 which loads the corresponding values into the timer 148. When there is no absolute timer values to load, the timer loading/wrapping control unit 146 handles the out of boundary events from each segment of the timer 148.

As a result, the timer loading/wrapping control unit 146 loads the timer with a timer value that includes two parts, namely the 33-bit n_timer[32:0] value to block 148 and the 17-bit hh_mm_ss[16:0] value to block 147. In this example, the n_timer [32:0] value has 30 integer bits with 1 nanosecond as its unit, and 3 fractional bits so that the range of the n_timer value is enough to represent 1 second. As depicted, the n_timer value goes out to one input of the second input multiplexer 144 for input to the accumulator 143. In addition, the hh_mm_ss[16:0] values has three segments (e.g., hh_mm_ss[16:12]:hh_mm_ss[11:6]:hh_mm_ss[5:0]) to represent HOUR, MINUTE, and SECOND, respectively.

In addition, the nano-second timer core 140 includes an hour:minute:second generator 147 which is driven by the nano-second timer to generate the HOUR:MINUTE:SECOND clock time output signal (hh_mm_ss). With the adder circuit 141 and multiplexer 142 connected to the receive the first nanosecond adjustment signal (nano_s_adj) and second frequency compensation enable signal (F_comp_en) from the FOATC unit 110, accumulator 143 may nominally increment the CK_period in nano-seconds.

Working together with modules, like the FOATC unit 110 and the TADT unit 120, the high resolution timer 140 can adjust its frequency and phase by generating the timer output signals, N_timer [32:0], and hh_mm_ss[16:0] for output to the pulse generation unit 130. To implement this functionality, the nano-second timer core 140 includes internal logic to compute a timer increment value (n_timer=n_timer+CK_period+f_comp_en && nano_s_adj+DRIFT_TRK_EN & TIMER_OFFSET). The nano-second timer core 140 is also configured with internal logic to perform the following 1 second wrapping check and mm and hh increment checks:

ss_incr=(n_timer[32:11]>=one_second[29:8]);
 Mm_incr=ss_incr && (hh_mm_ss[5:0]==6'd59]);
 Hh_incr=mm_incr && (hh_mm_ss[11:6]==6'd59); and
 Hh_wrap=Hh_incr && (Hh_mm_ss[16:12]==5'd23).

If ss_incr=1, then the high resolution timer 140 is configured with internal logic to perform the following computations:

set n_timer[32:11]=n_timer[32:11]−one_second[29:8];
 Hh_mm_ss[5:0]=mm_incr?6'd0:hh_mm_ss[5:0]+1//for SECOND;
 Hh_mm_ss[11:6]=hh_incr ?6'd0:hh_mm_ss[11:6]+1//for MINUTE; and
 Hh_mm_ss[16:12]=hh_incr && hh_wrap?5'd0:hh_mm_ss[16:12]+1//for HOUR.

Pulse Generation Unit

In selected embodiments, the pulse generation unit 130 is driven by the local clock input signal (CK_local) with a period of CK_period. The pulse generation unit 130 is also connected to receive input control signals from one or more control registers, where some of the input control signals need synchronization before driving circuitries. In particular, the pulse generation unit 130 is connected to receive a first control signal (Pulse_gen_en[3:0]) which enables pulse generation. In addition, the pulse generation unit 130 is connected to receive one or more of the input parameters listed above from the host software to control the operation of the pulse generation unit 130.

Based on the real time input signals, control signals and input parameters, the pulse generation unit 130 is configured to generate one or more output signals (Synced_pulse[3:0]) based on the adjusted timer output signal (Time_output) provided by the timer core 140. In selected embodiments, the adjusted timer output signal Time_output={hh_mm_ss_out[16:0], n_timer_out [32:0]} from unit 149.

In selected embodiments, the pulse generation unit 130 is configured to generate four output signals, called synced_pulse[3:0], for control or synchronization. The generation of each signal is totally independent, using corresponding input control parameters for each signal.

For each output signal from the pulse generation unit 130, the characteristics of each synced_pulse are determined by input parameters, including sole_periodical, reset_state, level_pulse, start_time, and pulse_width.

In a first single or sole pulse case example, a signal mode parameter (Sole_Periodical) specifies a sole mode (e.g., Sole_Periodical=0) to indicate that the output signal is a single pulse. With a reset_state parameter=0, the signal idle state is indicated, thereby determining the polarity of the pulse or level. As disclosed herein, the reset_state parameter needs to be reset before pulse generation or setting the effective level. With a Level_pulse parameter=0, the signal is identified as a pulse signal, and not a level change. The pulse start time is specified with the start_time parameter generated by combining the hh_mm_ss and nano-timer value (hh:mm:ss:nnnn) to indicate when the pulse will be generated when the value in the timer 149 matches the specified "start_time" value. With the pulse_width parameter, the width of the pulse is specified in nano-seconds, and should be smaller than 1 second. For example, with the pulse_width parameter=20, the width of the single or solo pulse is 20 nano-seconds, starting from when the timer value 149 matches the start time parameter value.

In a second periodic pulse case example, the signal mode parameter specifies a periodic mode (e.g., Sole_Periodical=1) to indicate that the output signal is multiple, periodic pulses. With the reset_state parameter=0, the signal idle state is indicated as low (or "0"), thereby determining the polarity of the pulse or level. With the Level_pulse parameter=0, the signal is identified as a pulse signal, and not a level change. The pulse start time is specified with the start_time parameter generated by combining the hh_mm_ss and nano-timer value (hh:mm:ss:nnnn) to indicate when the first pulse in the pulse train will be generated (e.g., when the value in the timer 149 matches the specified "start_time" value). With the pulse_width parameter, the width of the pulse is specified in nano-seconds, and should be smaller than 1 second. With the pulse_period parameter, the pulse period is specified in milliseconds. For example, with the pulse_width parameter=20, and the pulse_period parameter=1, a string of periodic pulses is generated having individual pulse widths of 20 nano-seconds and a periodic repetition rate every 1 milliseconds, starting from when the timer value 149 matches the start time parameter value. Following is the procedure to generate one synced_pulse[0] using mentioned parameters.

Step 0: Reset synced_pulse[0]=0, according to reset_state=0;

Step 1: set synced_pulse=1, when timer 149 matches (>=) parameter "start_time" if pulse_gen_en=1;

Step 2: set synced_pulse[0]=0, after 20 ns, specified by the parameter "pulse_width";

Step 3: Repeating step 1 and step 2, after timer 149 matches (>=) "start_time"+"pulse_period"*k (k=1, 2 . . . ); and If pulse_gen_en is de-asserted in any states, go back to step 0 to reset synced_pulse[1].

Accuracy Analysis and Limitations

As will be appreciated, the accuracy of the disclosed adjustable high resolution timer depends on the signals used in the design. For example, a practical and effective implementation is achieved when the local clock is a 320 MHz clock. In this example, the accuracy of the frequency offset detection is affected by the frequency of the input pulse train signal (in_sync_pulse_1). However, one cycle uncertainty cannot be avoided due to the nature of asynchronization between local clock and the input pulse train signal (in_sync_pulse_1). If the signal slew rate variation of the input pulse train signal (in_sync_pulse_1) is within one 320 MHz clock cycle, the systematic detection error is one 320 MHz clock cycle. The resulting detection accuracy is $3.125/10^9=0.003$ ppm for 1 PPS. For an input pulse train signal (in_sync_pulse_1) having a frequency of 10 KHz, the detection accuracy is $3.125/10^5=31$ ppm. If more detection accuracy is needed, more cycle detection can be used.

The accuracy of the nano-second timer core 140 is affected by different sources. For example, with the timer being driven by a clock with period of 3.125 ns, the accuracy cannot be better than 3.125+1 ns, where the 1 ns is due to frequency compensation. There can also be timer drift due to inaccuracy of frequency detection. If the frequency of the input pulse train signal (in_sync_pulse_2) is 1 KHz, for 30 ppm residue frequency offset, the total drift will be 30 ns. Inaccuracy at any time will be less than 30 ns for these conditions. If this is not sufficiently accurate, frequency drift tracking can be implemented to reduce the residue frequency offset. Alternatively, the frequency of the input pulse train signal (in_sync_pulse_2) can be increased.

The accuracy of the pulse generation unit 130 is limited by the minimum pulse width being one 320 MHz clock cycle. In addition, pulse start time accuracy and pulse train jitter are determined by above timer accuracy.

By now it should be appreciated that there is provided herein an adjustable high resolution timer for synchronizing a local clock to an external reference clock that includes a frequency offset acquisition and compensation unit or circuitry, time drift tracking and adjustment unit or circuitry, a nanosecond timer core unit or circuitry, and a pulse generation unit or circuitry. The frequency offset acquisition and compensation unit/circuitry is configured to acquire a frequency offset difference between the local and external reference clock and to generate frequency adjustment signals based on the frequency offset difference. In addition, the time drift tracking and adjustment unit/circuitry is configured to continuously monitor the local and external reference clocks for phase offset differences therebetween and to generate timing adjustment signals based on the phase offset difference. In addition, the nanosecond timer core unit/circuitry is configured to generate a frequency and phase adjusted nanosecond timer output signal in response to the frequency adjustment signals and timing adjustment signals. In addition, the pulse generation unit/circuitry is configured to generate a plurality of output pulse signals that are synchronized with the external reference clock in response to the frequency and phase adjusted nanosecond timer output signal. In selected embodiments, the frequency offset acquisition and compensation unit/circuitry includes a frequency offset acquisition unit or circuitry configured to detect the frequency offset difference between a local clock frequency and an external reference clock frequency; a frequency offset compensation unit or circuitry configured to generate the frequency adjustment signals by generating a frequency compensation enable signal and nanosecond adjustment signal for adjusting a clock period input to an accumulator at the nanosecond timer core circuitry; and a frequency offset tracking unit or circuitry configured to continuously monitor residue frequency offset between the local clock and external reference clock after frequency offsets compensation. In selected embodiments, the time drift tracking and adjustment unit/circuitry includes a drift tracking unit or circuitry configured to continuously monitor the phase offset difference between the local clock phase and the external reference clock phase and to generate a timer offset signal as one of the timing adjustment signals; and a timing setting unit or circuitry configured to generate additional timing adjustment signals by generating a time adjustment enable signal to enable time adjustment, a first adjustment signal for adjusting the nanosecond timer output signal for timing drift, and a second adjustment signal for setting a time value. In selected embodiments, the nanosecond timer core circuitry includes a nanosecond timer driven by the local clock to generate a nanosecond timer output signal; a first timer adjustment circuit for adjusting the nanosecond timer output signal in response to the frequency adjustment signals; and a second timer adjustment circuit for adjusting the nanosecond timer output to compensate for timing drift in response to the timing adjustment signals. In such embodiments, the nanosecond timer may include an accumulator that is driven by a local clock period input signal to generate the nanosecond timer output signal. In addition, the first timer adjustment circuit may include a first adder circuit connected to add the local clock period input signal with a first adjustment signal to form an increment value; and a first multiplexer for selectively connecting the increment value or the local clock period input signal as a first input to the accumulator in response to the frequency adjustment signals. In addition, the second timer adjustment circuit may include a second adder circuit connected to add the frequency and phase adjusted nanosecond timer output signal with a second adjustment signal to form an incremental phase adjustment value; and a second multiplexer for selectively connecting the incremental phase adjustment or the frequency and phase adjusted nanosecond timer output signal as a second input to the accumulator in response to the timing adjustment signals. In selected embodiments, the nanosecond timer core circuitry includes a timer loading and wrapping control circuitry configured to load a timer value register with an absolute timer value or normal timer wraparound in response to the timing adjustment signals.

In another form, there is provided an adjustable timer and associated timer control method for synchronizing a local clock to an external reference clock. In the disclosed timer control method, a local clock is received as an input to an adjustable timer. In addition, the timer control method acquires a frequency offset difference between the input local clock and the external reference clock. In selected embodiments, the frequency offset difference is acquired by receiving input parameters from host software that are stored in one or more control registers. In other embodiments, the frequency offset difference is acquired by comparing an external synchronization pulse train signal to the local clock. The timer control method also generates a plurality of frequency adjustment signals to compensate for the frequency offset difference. In selected embodiments, the frequency adjustment signals are generated by generating a frequency compensation enable signal and nanosecond adjustment signal for adjusting a clock period input to an accumulator at a nanosecond timer core circuitry of the adjustable timer. In addition, the timer control method generates a frequency and phase adjusted nanosecond timer output signal in response to the frequency adjustment signals. In selected embodiments, the frequency and phase adjusted nanosecond timer output signal is generated by generating a nanosecond timer output signal at a nanosecond timer driven by the local clock; adjusting the nanosecond timer output signal in response to the frequency adjustment signals to compensate for the frequency offset difference; and adjusting the nanosecond timer output with a phase offset to compensate for timing drift. In such embodiments, the nanosecond timer output may be generated by driving an accumulator with a local clock input signal having a 1 ns clock period. In addition, the nanosecond timer output signal may be adjusted in response to the frequency adjustment signals by incrementing the local clock input signal with a first adjustment signal to form a first increment value and selectively connecting the first increment value as a first input to the accumulator in response to the frequency adjustment signals, thereby generating a frequency adjusted nanosecond timer output signal. In addition, the nanosecond timer output may be adjusted with a phase offset by incrementing the frequency adjusted nanosecond timer output signal with a second phase adjustment signal to form a second increment value and selectively connecting the second increment value as a second input to the accumulator in response to timing adjustment signals generated in response to timing drift between the local clock and external reference clock. The timer control method also generates a plurality of output pulse signals that are synchronized with the external reference clock in response to the frequency and phase adjusted nanosecond timer output signal. In selected embodiments, the plurality of output pulse signals are generated by generating an output pulse stream characterized by a first parameter specifying if the output pulse stream is a single pulse or periodic pulse; a second parameter specifying if the output pulse stream is in a reset state; a third parameter specifying if the output pulse stream is a level signal or pulse signal; a fourth parameter specifying a pulse width for the output pulse stream; and a fifth parameter specifying a pulse period for the output pulse stream. In selected embodiments, the timer control method may also include continuously monitoring residue frequency offset between the local clock and external reference clock after generating the plurality of frequency adjustment signals to compensate for the frequency offset difference. In addition, the timer control method may also include continuously monitoring the local clock and external reference clock for phase offset differences resulting from timing drift between the local clock and the external reference clock; generating timing adjustment signals based on the phase offset difference; and generating a modified frequency and phase adjusted nanosecond timer output signal in response to the timing adjustment signals. In such embodiments, the generated timing adjustment signals may include a timer_offset signal in response to the phase offset difference; a drift tracking enable signal to enable phase adjustment of the frequency and phase adjusted nanosecond timer output signal; a time adjustment enable signal to enable time adjustment; and one or more timer adjustment signals for adjusting the nanosecond timer output signal for timing drift.

Although the described exemplary embodiments disclosed herein are directed to an adjustable high resolution timer and methods for operating same, the present invention is not necessarily limited to the example embodiments which illustrate inventive aspects of the present invention that are applicable to a wide variety of circuit designs and operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the identification of the specific circuit configurations provided herein is merely by way of illustration and not limitation and other circuit arrangements may be used in order to form the synchronous rectifier timer controller. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An adjustable timer for synchronizing a local clock to an external reference clock, comprising:
    a frequency offset acquisition and compensation circuitry configured to acquire a frequency offset difference between the local clock and the external reference clock, and to generate frequency adjustment signals based on the frequency offset difference;
    a time drift tracking and adjustment circuitry configured to continuously monitor the local clock and external reference clock for phase offset difference between the local clock and the external reference clock and to generate timing adjustment signals based on the phase offset difference;
    a nanosecond timer core circuitry configured to generate a frequency and phase adjusted nanosecond timer output signal in response to the frequency adjustment signals and timing adjustment signals; and
    a pulse generation circuitry for generating a plurality of output pulse signals that are synchronized with the external reference clock in response to the frequency and phase adjusted nanosecond timer output signal.

2. The adjustable timer of claim 1, where the frequency offset acquisition and compensation circuitry comprises:
    a frequency offset acquisition circuitry configured to detect the frequency offset difference between a local clock frequency and an external reference clock frequency;
    a frequency offset compensation circuitry configured to generate the frequency adjustment signals by generating a frequency compensation enable signal and nanosecond adjustment signal for adjusting a clock period input to an accumulator at the nanosecond timer core circuitry; and
    a frequency offset tracking circuitry configured to continuously monitor residue frequency offset between the local clock and external reference clock after frequency offsets compensation.

3. The adjustable timer of claim 1, where the time drift tracking and adjustment circuitry comprises:
    a drift tracking circuitry configured to continuously monitor the phase offset difference between the local clock phase and the external reference clock phase and to generate a timer offset signal as one of the timing adjustment signals; and
    a timing setting circuitry configured to generate additional timing adjustment signals by generating a time adjustment enable signal to enable time adjustment, a first adjustment signal for adjusting the nanosecond timer output signal for timing drift, and a second adjustment signal for setting a time value.

4. The adjustable timer of claim 1, where the nanosecond timer core circuitry comprises:
    a nanosecond timer driven by the local clock to generate a nanosecond timer output signal;
    a first timer adjustment circuit for adjusting the nanosecond timer output signal in response to the frequency adjustment signals; and
    a second timer adjustment circuit for adjusting the nanosecond timer output to compensate for timing drift in response to the timing adjustment signals.

5. The adjustable timer of claim 4, where the nanosecond timer comprises an accumulator driven by a local clock period input signal to generate the nanosecond timer output signal.

6. The adjustable timer of claim 5, where the first timer adjustment circuit comprises:
    a first adder circuit connected to add the local clock period input signal with a first adjustment signal to form an increment value; and
    a first multiplexer for selectively connecting the increment value or the local clock period input signal as a first input to the accumulator in response to the frequency adjustment signals.

7. The adjustable timer of claim 6, where the second timer adjustment circuit comprises:
    a second adder circuit connected to add the frequency and phase adjusted nanosecond timer output signal with a second adjustment signal to form an incremental phase adjustment value; and
    a second multiplexer for selectively connecting the incremental phase adjustment or the frequency and phase adjusted nanosecond timer output signal as a second input to the accumulator in response to the timing adjustment signals.

8. The adjustable timer of claim 1, where the nanosecond timer core circuitry comprises a timer loading and wrapping control circuitry configured to load a timer value register with an absolute timer value or normal timer wrap-around in response to the timing adjustment signals.

9. The timer control method for synchronizing a local clock to an external reference clock, comprising:
    receiving a local clock as an input to an adjustable timer;
    acquiring a frequency offset difference between the input local clock and the external reference clock;
    generating a plurality of frequency adjustment signals to compensate for the frequency offset difference;
    generating a frequency and phase adjusted nanosecond timer output signal in response to the frequency adjustment signals; and generating a plurality of output pulse signals that are synchronized with the external reference clock in response to the frequency and phase adjusted nanosecond timer output signal.

10. The timer control method of claim 9, where acquiring the frequency offset difference comprises receiving input parameters from host software that are stored in one or more control registers.

11. The timer control method of claim 9, where acquiring the frequency offset difference comprises comparing an external synchronization pulse train signal to the local clock.

12. The timer control method of claim 9, where generating the plurality of frequency adjustment signals comprises generating a frequency compensation enable signal and nanosecond adjustment signal for adjusting a clock period input to an accumulator at a nanosecond timer core circuitry of the adjustable timer.

13. The timer control method of claim 9, further comprising continuously monitoring residue frequency offset between the local clock and external reference clock after generating the plurality of frequency adjustment signals to compensate for the frequency offset difference.

14. The timer control method of claim 9, further comprising:
continuously monitoring the local clock and external reference clock for phase offset differences resulting from timing drift between the local clock and the external reference clock;
generating timing adjustment signals based on the phase offset difference; and
generating a modified frequency and phase adjusted nanosecond timer output signal in response to the timing adjustment signals.

15. The timer control method of claim 14, where generating timing adjustment signals comprises:
generating a timer offset signal in response to the phase offset difference;
generating a drift tracking enable signal to enable phase adjustment of the frequency and phase adjusted nanosecond timer output signal;
generating a time adjustment enable signal to enable time adjustment; and
generating one or more timer adjustment signals for adjusting the nanosecond timer output signal for timing drift.

16. The timer control method of claim 9, where generating the plurality of output pulse signals comprises generating an output pulse stream characterized by:
a first parameter specifying if the output pulse stream is a single pulse or periodic pulse;
a second parameter specifying if the output pulse stream is in a reset state;
a third parameter specifying if the output pulse stream is a level signal or pulse signal;
a fourth parameter specifying a pulse width for the output pulse stream; and
a fifth parameter specifying a pulse period for the output pulse stream.

17. The timer control method of claim 9, where generating the frequency and phase adjusted nanosecond timer output signal comprises:
generating a nanosecond timer output signal at a nanosecond timer driven by the local clock;
adjusting the nanosecond timer output signal in response to the frequency adjustment signals to compensate for the frequency offset difference; and
adjusting the nanosecond timer output with a phase offset to compensate for timing drift.

18. The timer control method of claim 17, where generating the nanosecond timer output comprises driving an accumulator with a local clock input signal having a 1 ns clock period.

19. The timer control method of claim 18, where adjusting the nanosecond timer output signal in response to the frequency adjustment signals comprises:
incrementing the local clock input signal with a first adjustment signal to form a first increment value and selectively connecting the first increment value as a first input to the accumulator in response to the frequency adjustment signals, thereby generating a frequency adjusted nanosecond timer output signal.

20. The timer control method of claim 19, where adjusting the nanosecond timer output with a phase offset comprises:
incrementing the frequency adjusted nanosecond timer output signal with a second phase adjustment signal to form a second increment value and selectively connecting the second increment value as a second input to the accumulator in response to timing adjustment signals generated in response to timing drift between the local clock and external reference clock.

* * * * *